United States Patent Office 3,151,935
Patented Oct. 6, 1964

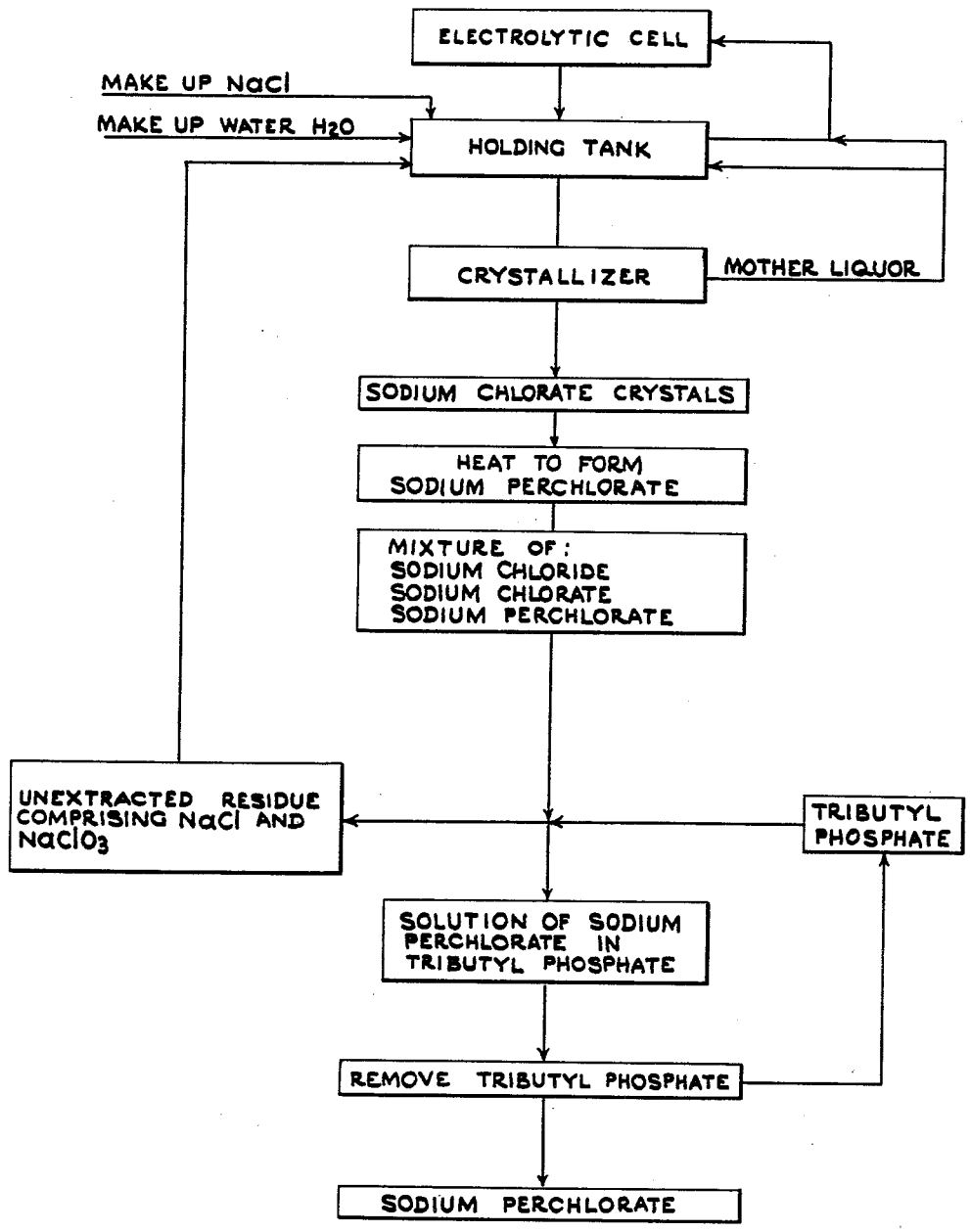

3,151,935
PROCESS OF MAKING AND RECOVERING SODIUM PERCHLORATE
Howard H. Hoekje and Harold M. Hilliard, Jr., Corpus Christi, Tex., assignors, by mesne assignments, to Pittsburgh Plate Glass Company
Filed Jan. 7, 1959, Ser. No. 785,371
9 Claims. (Cl. 23—85)

This invention relates to a novel method of preparing and/or recovering sodium perchlorate.

According to this invention, it has been found that sodium perchlorate may be recovered from mixtures of sodium chloride and sodium perchlorate by extracting the mixture with a limited amount of a liquid solvent (particularly organic solvents) which contains an atom (oxygen or nitrogen) which is capable of donating an electron pair to a coordination bond. There are a number of types of such solvents including liquid esters, ketones, amines, and amides. Typical of such solvents are:

Alkyl phosphates such as trimethyl phosphate, triethyl phosphate, tri-n-propyl phosphate, tributoxy ethyl phosphate or tributyl phosphate.

Ketones such as acetone, methyl ethyl ketone or methyl isobutyl ketone.

Esters such as diethyl carbonate, diethyl phthalate, ethyl formate, ethyl acetate and corresponding esters of other carboxylic acids.

Amines such as ethylene diamine, propylene diamine and like amino compounds.

Amides such as dimethyl formamide.

The solvents used are capable of dissolving at least 25 grams of sodium perchlorate per liter of solution. Moreover, in order to reduce as much as possible the amount of sodium chloride dissolved, the amount of such solvent should be held low enough but still ensure production of a solution containing at least 25 grams of sodium perchlorate per liter of solution.

Thus the above solvents are capable of dissolving both sodium chloride and sodium perchlorate in some amount. By restricting the amount of such solvent so as to avoid dissolving all of the solids and/or to ensure production of a solution containing at least 25 grams of dissolved solids per liter, it is found that the proportion of sodium perchlorate to sodium chloride in the solvent is substantially higher than the ratio of sodium perchlorate to sodium chloride in the initial mixture. Thus, it is possible to effect separation of a major portion of sodium chloride from the sodium perchlorate. The sodium perchlorate can then be recovered from the solvent solution by convenient means, such as distillation of the solvent from the perchlorate or where the solvent is substantially immiscible with water by extraction of the perchlorate from the solvent with water.

According to a further embodiment, it is also found that similar results can be achieved by treatment of mixtures of sodium chlorate and sodium perchlorate. Thus, when a mixture of solid sodium chlorate and solid sodium perchlorate is extracted with an organic solvent of the type mentioned above such as tributyl phosphate, while limiting the amount of solvent to produce a solution containing at least 25 grams per liter of dissolved solids (chlorate and perchlorate) the major portion of the sodium perchlorate goes into solution into the solvent leaving a major portion of the sodium chlorate behind.

It will also be understood that solid mixtures of sodium chloride, sodium chlorate, and sodium perchlorate may be extracted with the organic solvent as herein contemplated. In such a case, a relatively pure sodium perchlorate can be obtained by extracting these mixtures with a solvent, such as tributyl phosphate, removing the solvent from the solid mixture, and separating the solvent from the sodium perchlorate dissolved therein.

The process herein contemplated may be effectively performed in connection with the electrolytic manufacture of sodium chlorate as illustrated in the accompanying drawing. Thus, an aqueous solution of sodium chloride containing 100 to 315 grams of sodium chloride per liter of solution may be subjected to electrolysis in an electrolytic cell suitable for production of sodium chlorate, with consequent production of an aqueous solution containing up to 600 grams of sodium chlorate and 100 to 315 of sodium chloride per liter of solution. This solution, which may be conveniently formed by conducting the electrolysis at an elevated temperature, for example, above 40° C., may then be treated to crystallize sodium chlorate from the solution. The resulting sodium chlorate crystals are recovered from the solution and the residual solution is recycled to the electrolytic cell. Normally, an aqueous solution is continuously cycled through the electrolytic cell and thence to a holding tank in order to ensure and promote formation of sodium chlorate. Periodically or continuously, a portion of the sodium chlorate solution in the holding tank is withdrawn and sent to a crystallizer, the crystals of sodium chlorate recovered, and the residual solution recycled to the electrolytic cell or to the holding tank.

The sodium chlorate crystals are then heated to an elevated temperature in the range of about 400 to 600° C. to cause conversion of sodium chlorate to sodium perchlorate and sodium chloride. Normally, for most purposes, it is desired to avoid heating long enough to effect a complete conversion of the sodium chlorate. This is necessary since otherwise side reactions tend to occur resulting in decomposition of sodium chlorate without generation of sodium perchlorate. Thus, in the preferred embodiment of the invention, heating at the above temperatures is continued only long enough to convert about 20 to 90 percent by weight of the chlorate. Usually, heating for a period of 1 to 15 minutes at 480 to 515° C. is sufficient for this purpose. At lower temperatures, e.g., 400 to 480° C., 30 minutes or more is necessary.

The result is to produce a solid mixture of sodium chloride, sodium chlorate and sodium perchlorate. These mixtures usually contain about 5 to 65 percent by weight of sodium chloride, 10 to 50 percent by weight of sodium chloride, and 10 to 75 percent by weight of sodium perchlorate.

Following preparation of a mixture of this character, the mixture is extracted with an organic solvent such as tributyl phosphate using an amount of solvent small enough to produce a solution containing at least 25 to 50 grams per liter of dissolved solids. As a consequence, a sodium perchlorate concentrate dissolved in the tributyl phosphate is produced. This solution may contain minor concentrations of sodium chloride and sodium chlorate. However, the effect of the extraction is to substantially enrich the sodium perchlorate.

The resulting solution is withdrawn from the undissolved residue of sodium chloride and sodium chlorate and the residue, usually after washing residual tributyl phosphate from the solids, is dissolved in water and recycled to the holding tank or directly to the electrolytic cell. Conveniently this solid sodium chloride-sodium chlorate mixture may be used to increase the concentration of the mother liquor coming from the crystallization of sodium chlorate.

The solution is treated to separate the sodium perchlorate from the tributyl phosphate or like solvent. This may be done conveniently by simply distilling the tributyl phosphate from the sodium perchlorate. In such case, the solvent is evaporated and reused for further extraction while the residue of sodium perchlorate is collected. This sodium perchlorate is relatively pure, usually containing in the range of 90 to 98 percent or higher sodium perchlorate by weight. Small amounts of sodium chloride and sodium chlorate may also be present.

As previously stated, in order to effect a satisfactory extraction and selective recovery of the sodium perchlorate, it is necessary that the amount of solvent used should be less than that necessary to dissolve the entire mixture. Thus, it is necessary to leave a solid undissolved residue which, as heretofore stated, comprises the major portion of the sodium chloride and sodium chlorate. The exact amount of solvent required depends upon the nature of the solvent. Also, the presence of small amounts of water in the solvent changes its solvent characteristics at least to a degree. The solvent, such as tributyl phosphate, may be either dry or may contain water. One convenient way to remove the sodium perchlorate from the water immiscible solvents such as tributyl phosphate or the like is to extract it with water. The sodium perchlorate dissolves in the water and the tributyl phosphate is separated therefrom and is recycled for further extraction of the sodium chloride-sodium chlorate-sodium perchlorate mixture. Such recycled tributyl phosphate contains an appreciable amount of water and usually the solvent is substantially saturated with water at the temperature of the water extraction. The presence of this water does not seriously affect the removal of sodium perchlorate from the mixture with sodium chloride and sodium chlorate.

The accompanying flow sheet diagrammatically illustrates the process as described above and is self-explanatory.

The following examples are illustrative:

EXAMPLE I

A solid mixture containing sodium chloride and sodium chlorate in the ratio of 4.8 grams of NaCl to 35.2 grams of NaClO$_3$ was heated at a temperature of 510° C. for 5 minutes. Thereupon, the mixture was immediately cooled. This mixture contained sodium chloride, sodium chlorate, and sodium perchlorate, in the ratio of 11.9 grams of sodium chloride to 7.4 grams of sodium chlorate and 17.8 grams of sodium perchlorate. The resulting product was pulverized and shaken up with 150 milliliters of tributyl phosphate at room temperature for a period of about 16 hours. The solids were removed by filtration and were found to contain 9.1 grams of NaCl, 5.0 grams of NaClO$_3$, and 0.9 gram of sodium perchlorate. The solution was heated to evaporate the tributyl phosphate. The resulting residue contained 0.10 gram of sodium chloride, 0.40 gram of sodium chlorate, and 14.0 grams of sodium perchlorate. Thus, 94 percent of the sodium perchlorate was extracted from the mixture.

While the above example has been directed primarily to the performance of the process using tributyl phosphate as the solvent, various other phosphate esters may be used. These include esters of phosphoric acid and alcohols, ether alcohols, and the like, usually containing not in excess of about 18 carbon atoms.

Typical esters which are suitable include triethyl phosphate, tributoxyethyl phosphate, dibutyl phosphate, and the like.

EXAMPLE II

Quantities of the solvents set forth in the following table were shaken up at room temperature (except where specified otherwise) with a mixture of solid sodium chlorate, sodium chloride, and sodium perchlorate, using enough of each of these solids to ensure the presence of a residue of each in solid state after the solution had become saturated. The solution contained the following amounts of each material:

*Table I*

| Solvent | Dissolved NaClO$_3$, grams per liter | Dissolved NaClO$_4$, grams per liter | Dissolved NaCl, grams per liter |
|---|---|---|---|
| Triethyl phosphate | 0.2 | 237 | 0.6 |
| Ethylene diamine: | | | |
| 30° C | 38 | 252 | 1.3 |
| 50° C | 104 | 406 | 3 |
| Dimethyl formamide: | | | |
| 30° C | 16.8 | 282 | 0.2 |
| 50° C | 15.8 | 384 | 0.2 |
| Methyl alcohol | 11.8 | 265 | 0.01 |
| Propionaldehyde | 0.01 | 55.8 | 0.01 |
| Acetyl acetone | 0.5 | 245.9 | 2.3 |
| Ethyl formate | 17.0 | 281 | 11.5 |
| Trimethyl phosphate | 0.1 | 354 | 0.3 |
| Tri-n-propyl phosphate | 0.06 | 184.6 | 1.2 |
| Diethyl ethyl phosphate | 0.03 | 279.3 | 0.7 |
| Triethylene tetramine | 2.7 | 83.6 | 3.5 |
| Acetone | 1.7 | 368 | 0.2 |
| Methyl ethyl ketone | 0.5 | 203 | 0.3 |
| Methyl isobutyl ketone | 0.1 | 49 | 0.2 |

EXAMPLE III

The process of Example II was performed using acetone containing 5 percent by weight of water and a mixture of solid sodium chlorate and sodium perchlorate. The solution obtained contained 233 grams per liter of sodium perchlorate and only 4.8 grams per liter of sodium chlorate. The solubility of sodium chloride in such an acetone-water mixture was found to be 12.3 grams per liter. Thus, the presence of sodium perchlorate appears to depress the solubility of sodium chlorate.

In addition to the above liquids various liquid inorganic solvents may be used. For example, liquid ammonia may be used to extract a sodium chloride-chlorate-perchlorate mixture of the type described in the above examples. This extraction will produce a solution containing a high concentration of perchlorate but less concentration of sodium chloride and chlorate. The following is the composition of a typical solution produced in this manner.

Parts by weight
NH$_3$ ---------------------------------- 27.7
NaCl ---------------------------------- 0.1
NaClO$_3$ ---------------------------------- 2.4
NaClO$_4$ ---------------------------------- 69.8

This solution is liquid at 23° C. The perchlorate may be recovered by vaporizing off the ammonia.

Although the present invention has been described with reference to the specific details of certain embodiments, it is not intended that such details shall be regarded as limitations upon the scope of the invention except insofar as included in the accompanying claims.

What is claimed is:

1. A method of recovering sodium perchlorate from a solid mixture of sodium perchlorate and an impurity of the group consisting of sodium chloride, sodium chlorate and mixtures thereof which comprises extracting the mixture with a liquid alkyl phosphate in amounts sufficient to dissolve only a portion of said solids.

2. A method of recovering sodium perchlorate from a solid mixture of sodium perchlorate and an impurity of the group consisting of sodium chloride, sodium chlorate and mixtures thereof which comprises extracting the mixture with a liquid alkyl phosphate of an alcohol containing up to 18 carbon atoms in amounts sufficient to dissolve only a portion of said solids.

3. A method of recovering sodium perchlorate from a solid mixture of sodium perchlorate and an impurity of the group consisting of sodium chloride, sodium chlorate and mixtures thereof which comprises extracting the mixture with tributyl phosphate in amounts sufficient to dissolve only a portion of said solids.

4. A method of recovering sodium perchlorate from a solid mixture of sodium perchlorate, sodium chloride, and sodium chlorate, which comprises extracting the mixture with an amount of a liquid alkyl phosphate sufficient to dissolve only a portion of the solids, removing the resulting solution from the resulting undissolved solids, and extracting the solution with water to recover sodium perchlorate therefrom.

5. A method of recovering sodium perchlorate from a solid mixture of sodium perchlorate, sodium chloride and sodium chlorate, which comprises extracting the mixture with an amount of a liquid alkyl phosphate sufficient to dissolve only a portion of the solids, and removing the resulting solution from the resulting undissolved solids and recovering sodium perchlorate from the resulting extraction solution.

6. A method of preparing and recovering sodium perchlorate which comprises electrolyzing an aqueous solution of sodium chloride to produce a solution of sodium chloride and sodium chlorate, crystallizing sodium chlorate from said solution, heating the sodium chlorate thus crystallized to convert only a portion of the sodium chlorate to sodium perchlorate, leaving a portion of the sodium chlorate unconverted and thereby producing a mixture of sodium chloride, sodium chlorate and sodium perchlorate, extracting the resulting solid mixture with a liquid alkyl phosphate while limiting the amount of said liquid alkyl phosphate to dissolve only a portion of said mixture, removing the resulting solution from the solid residue thus obtained, and recycling the residue containing sodium chloride and sodium chlorate to the solution undergoing electrolysis and recovering sodium perchlorate from the resulting extraction solution.

7. A method of preparing and recovering sodium perchlorate which comprises electrolyzing an aqueous solution of sodium chloride to produce a solution of sodium chloride and sodium chlorate, crystallizing sodium chlorate from said solution, heating the sodium chlorate thus crystallized to convert only a portion of the sodium chlorate to sodium perchlorate, leaving a portion of the sodium chlorate unconverted and thereby producing a mixture of sodium chloride, sodium chlorate and sodium perchlorate, extracting the resulting solid mixture with dibutyl phosphate while limiting the amount of said dibutyl phosphate to dissolve only a portion of said mixture, removing the resulting solution from the solid residue thus obtained, and recycling the residue containing sodium chloride and sodium chlorate to the solution undergoing electrolysis and recovering sodium perchlorate from the resulting extraction solution.

8. A method of preparing and recovering sodium perchlorate which comprises electrolyzing an aqueous solution of sodium chloride to produce a solution of sodium chloride and sodium chlorate, crystallizing sodium chlorate from said solution, heating the sodium chlorate thus crystallized to convert only a portion of the sodium chlorate to sodium perchlorate, leaving a portion of the sodium chlorate unconverted and thereby producing a mixture of sodium chloride, sodium chlorate, and sodium perchlorate, extracting the resulting solid mixture with liquid ammonia while limiting the amount of said liquid ammonia to dissolve only a portion of said mixture, removing the resulting solution from the solid residue thus obtained, and recycling the residue containing sodium chloride and sodium chlorate to the solution undergoing electrolysis and recovering sodium perchlorate from the resulting extraction solution.

9. A method of recovering sodium perchlorate from a solid mixture of sodium perchlorate and an impurity of the group consisting of sodium chloride, sodium chlorate and mixtures thereof, which comprises extracting the mixture with liquid ammonia, the amount of said ammonia being sufficient to dissolve only a portion of said solids and to insure production of a solution containing at least 25 grams of sodium perchlorate per liter of solution, and recovering the sodium perchlorate from the solution.

References Cited in the file of this patent

UNITED STATES PATENTS

| 2,075,179 | Cunningham | Mar. 30, 1937 |
| 2,511,516 | Schumacher | June 13, 1950 |
| 2,796,320 | Spedding et al. | June 18, 1957 |
| 2,812,233 | Lewis et al. | Nov. 5, 1957 |
| 2,813,001 | Ruhoff et al. | Nov. 12, 1957 |
| 2,833,616 | Voiland | May 6, 1958 |

OTHER REFERENCES

Kreider: "The Preparation of Perchloric Acid and Its Application to the Determination of Potassium," American Journal of Science, 3rd Series, vol. 49, pages 443–8 (1895).

Mellor: Comprehensive Treatise on Inorganic and Theoretical Chemistry, vol. 2, page 372 (1922). Longmans, Green and Co. (London and New York).

Isbin et al.: "The Solubility of Some Salts in Ethylenediamine, Monoethanolamine, and Ethylene Glycol," Jour. Amer. Chem. Soc., vol. 67, pages 464–5 (March 1945).

L. M. Mille: "Solubility in Acetone," Chem. Abstracts, vol. 44, pages 3336–7 (April–June 1950).